(12) United States Patent
Nordbruch

(10) Patent No.: US 10,597,080 B2
(45) Date of Patent: Mar. 24, 2020

(54) METHOD AND DEVICE FOR OPERATING A MOTOR VEHICLE TRAVELING DRIVERLESSLY WITHIN A PARKING FACILITY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/759,078

(22) PCT Filed: Jul. 15, 2016

(86) PCT No.: PCT/EP2016/066868
§ 371 (c)(1),
(2) Date: Mar. 9, 2018

(87) PCT Pub. No.: WO2017/041943
PCT Pub. Date: Mar. 16, 2017

(65) Prior Publication Data
US 2019/0077460 A1 Mar. 14, 2019

(30) Foreign Application Priority Data
Sep. 11, 2015 (DE) .................. 10 2015 217 387

(51) Int. Cl.
*B62D 15/02* (2006.01)
*G05D 1/02* (2020.01)

(52) U.S. Cl.
CPC ....... *B62D 15/0285* (2013.01); *G05D 1/0214* (2013.01); *G05D 2201/0213* (2013.01)

(58) Field of Classification Search
CPC ............ B62D 15/0285; G05D 1/0214; G05D 2201/0213
See application file for complete search history.

(56) References Cited

U.S. PATENT DOCUMENTS

| | | | |
|---|---|---|---|
| 2010/0156672 A1 | 6/2010 | Yoo et al. | |
| 2013/0158774 A1* | 6/2013 | Schmidt | B62D 15/0285 701/25 |

(Continued)

FOREIGN PATENT DOCUMENTS

| | | |
|---|---|---|
| DE | 102005029336 A1 | 4/2006 |
| DE | 102012216753 A1 | 3/2014 |
| DE | 102012222562 A1 | 6/2014 |

(Continued)

OTHER PUBLICATIONS

International Search Report dated Oct. 6, 2016, of the corresponding International Application PCT/EP2106/066868 filed Jul. 15, 2016.

*Primary Examiner* — Mahmoud S Ismail
*Assistant Examiner* — Bakari Underwood
(74) *Attorney, Agent, or Firm* — Norton Rose Fulbright US LLP; Gerard Messina

(57) ABSTRACT

A method for operating a motor vehicle driving driverlessly within a parking facility includes determining, for a predefined target trajectory to be traversed by the motor vehicle within the parking facility, that point in the target trajectory until which safe driverless driving of the motor vehicle is possible; and driverlessly driving the motor vehicle, based on the predefined target trajectory, out to the determined point.

20 Claims, 2 Drawing Sheets

(56) References Cited

U.S. PATENT DOCUMENTS

2017/0227967 A1\* 8/2017 Bariant .............. B62D 15/0285
2018/0053422 A1\* 2/2018 Altinger ............... G05D 1/0297

FOREIGN PATENT DOCUMENTS

| DE | 102013020733 A1 | 6/2015 |
|---|---|---|
| EP | 2695797 A2 | 2/2014 |
| WO | 2014023411 A1 | 2/2014 |

\* cited by examiner

METHOD AND DEVICE FOR OPERATING A MOTOR VEHICLE TRAVELING DRIVERLESSLY WITHIN A PARKING FACILITY

CROSS-REFERENCE TO RELATED APPLICATIONS

The present application is the national stage of International Pat. App. No. PCT/EP2016/066868 filed Jul. 15, 2016, and claims priority under 35 U.S.C. § 119 to DE 10 2015 217 387.9, filed in the Federal Republic of Germany on Sep. 11, 2015, the content of each of which are incorporated herein by reference in their entireties.

FIELD OF THE INVENTION

The present invention relates to a method, apparatus, vehicle, and/or computer program for operating a motor vehicle driving driverlessly within a parking facility.

BACKGROUND

German Published Application DE 10 2012 222 562 A1 presents a system for managed parking areas, for transferring a vehicle from a starting position to a destination position.

In fully automated (autonomous) "valet parking," a vehicle is parked by its driver at a dropoff location, for example in front of a parking garage, and the vehicle drives itself from there into a parking position/parking bay and back again to the dropoff location.

In the context of so-called fully automated valet parking, it is important that the autonomously driving vehicle not cause any accidents, for example that it not collide with an object that is located within the parking facility.

SUMMARY

An object on which the present invention is based may be regarded as that of furnishing an efficient concept that efficiently reduces a risk of accident or collision for a vehicle driving driverlessly within a parking facility.

According to one aspect, a method for operating a motor vehicle driving driverlessly within a parking facility includes: determining, for a predefined target trajectory to be traversed by the motor vehicle within the parking facility, that point in the target trajectory until which safe driverless driving of the motor vehicle is possible; and driverlessly driving the motor vehicle, based on the predefined target trajectory, out to the determined point.

According to a further aspect, an apparatus for operating a motor vehicle driving driverlessly within a parking facility includes: a determining device for determining, for a predefined target trajectory to be traversed by the motor vehicle within the parking facility, that point in the target trajectory until which safe driverless driving of the motor vehicle is possible; and a guidance device for driverlessly guiding the motor vehicle, the guidance device being embodied to driverlessly guide the motor vehicle, based on the predefined target trajectory, out to the determined point.

According to a further aspect, a motor vehicle encompasses the described apparatus for operating a motor vehicle driving driverlessly within a parking facility.

According to a further aspect, a computer program includes program code for carrying out the method for operating a motor vehicle driving driverlessly within a parking facility, when the computer program is executed on a computer.

The invention therefore encompasses, in particular and inter alia, that the motor vehicle is allowed to drive driverlessly only out to that point in a target trajectory out to which safe driverless driving can be ensured. This therefore means that driverless driving of the motor vehicle out to the determined point can be categorized as safe. This brings about in particular the technical advantage that an accident or collision risk for a motor vehicle driving driverlessly within a parking facility can be efficiently decreased. In particular, the technical advantage thereby brought about is that an accident or collision risk for a traffic participant located within the parking facility can be efficiently decreased.

"Safe driverless driving" of the motor vehicle refers in particular to driverless driving in the course of which an accident will occur only with a predetermined accident probability and/or a collision with an object will occur only with a predetermined collision probability.

"Determination" of the point encompasses, for example, the fact that a distance, relative to an instantaneous position of the motor vehicle in a driving direction predefined by the target trajectory, that the motor vehicle can still travel driverlessly is determined.

This therefore means in particular that the distance that the motor vehicle can still safely drive driverlessly based on the target trajectory is determined.

The fact that the motor vehicle is "driving driverlessly based on the predefined target trajectory" means in particular that an actual trajectory of the motor vehicle is regulated or controlled to the target trajectory.

The fact that the vehicle is "driving driverlessly" means or signifies that the vehicle is not being controlled or guided by a human driver or human vehicle operator. Driverless driving includes, for example, an instance where the vehicle is remotely controlled. This means, for example, that remote control commands are transmitted to the vehicle. Driverless driving includes, for example, an instance where the vehicle is driving autonomously, i.e., unassistedly. For example, mixed forms are provided, meaning that the vehicle is remotely controlled over one route segment and travels autonomously on another route segment.

Provision is made, for example, that a destination position within the parking facility is conveyed to the vehicle, the vehicle then driving autonomously, i.e., unassistedly, to that destination position. The vehicle navigates to the destination position, for example, based on a digital map of the parking facility. That digital map is conveyed to the vehicle, for example, via a communication network. In general, for example, information that is relevant for autonomous driving within the parking facility is conveyed to the vehicle via the communication network. Based on that information the vehicle then drives autonomously within the parking facility, in particular to the destination position. Such information encompasses, for example: positions of further vehicles, speed data for further vehicles, and a target trajectory to be traversed by the motor vehicle.

A "communication network" for purposes of the present invention encompasses in particular a WLAN communication network and/or a mobile radio network and/or a communication network in accordance with the low power wide-range communication (LoRa) standard. According to an embodiment, the communication network therefore encompasses a LoRa communication network.

In another embodiment, a communication via the communication network becomes and/or is encoded.

"Vehicles" for purposes of the present invention are motor vehicles.

A "parking facility" for purposes of the present invention can be referred to as a "parking area," and serves as an area for parking vehicles. The parking facility thus constitutes a contiguous area that has several parking locations (for a parking facility on private property) or parking spaces (for a parking facility on public property). According to an embodiment, the parking facility is embodied as a parking structure. According to an embodiment, the parking facility is embodied as a parking garage.

According to an embodiment, provision is made that the point is determined based on a sensing range of a surrounding-area sensor suite of the motor vehicle and/or on a sensing range of a surrounding-area sensor suite of the parking facility, so that the point is located within the corresponding sensing range.

This brings about in particular a technical advantage that it is possible to ensure efficiently that the corresponding surrounding area can be sensorially sensed out to the determined point. This therefore means that the motor vehicle can driverlessly drive only as far as the motor vehicle can sensorially sense its surrounding area, and/or a surrounding-area sensor suite of the parking facility can sense a surrounding area of the motor vehicle. It is thereby advantageously possible to prevent the motor vehicle from, so to speak, having to driverlessly drive "blind."

The surrounding-area sensor suite of the motor vehicle can be referred to as a "motor vehicle surrounding-area sensor suite." The surrounding-area sensor suite of the parking facility can be referred to as a "parking facility surrounding-area sensor suite."

According to an embodiment, a surrounding-area sensor suite for purposes of the present invention encompasses one or more surrounding-area sensors. A surrounding-area sensor is, for example, one of the following surrounding-area sensors: video sensor, laser sensor, ultrasonic sensor, lidar sensor, magnetic sensor, or radar sensor.

According to a further embodiment, provision is made that the surrounding-area sensor suite(s) encompass(es) several surrounding-area sensors having respective sensing ranges, the point being determined based on the shortest sensing range of the respective sensing ranges, so that the point is located within the shortest sensing range.

This brings about in particular a technical advantage that it is possible to ensure efficiently that the motor vehicle can sense its surrounding area, by way of all the several surrounding-area sensors, out to the determined point. The surrounding-area sensor having the shortest sensing range thus specifies the distance out to which the motor vehicle is permitted to drive, in terms of its instantaneous position and in terms of the driving direction predefined by the target trajectory. The various surrounding-area sensors thus, so to speak, "see" at least out to the predetermined point.

In accordance with a further embodiment, provision is made that the several surrounding-area sensors correspond to a subset of all the surrounding-area sensors of the respective surrounding-area sensor suite.

This therefore means in particular that not all the surrounding-area sensors of the respective surrounding-area sensor suite are used to determine the point. Instead, in accordance with this embodiment provision is made that only a subset of the surrounding-area sensors is used. This brings about in particular a technical advantage that the determination can be carried out efficiently. Advantageously, because fewer data now need to be processed compared with the case in which all the surrounding-area sensors of the respective surrounding-area sensor suite are used to determine the point, a computation capacity required therefor can thus advantageously be reduced or decreased.

In particular, surrounding-area sensors that are disposed at the rear end of the motor vehicle, and sense a rear-side surrounding area in a rearward driving direction, cannot as a rule, because of their disposition on the motor vehicle, sensorially sense the front-side space or front-side region in front of the motor vehicle. In that regard, it is technically useful and efficient not to use those surrounding-area sensors in order to determine the point.

A "surrounding-area sensor" for purposes of the present invention is therefore embodied in particular to sense a surrounding area of the motor vehicle and to ascertain surrounding-area data in accordance with the sensed surrounding area. According to an example embodiment, provision is made that, based on the surrounding-area data, a check is made as to whether an object that, with a predetermined probability, might collide with the motor vehicle is located in the surrounding area of the motor vehicle. If it is found in the context of this check, for example, that such an object is located in the surrounding area of the motor vehicle, provision is therefore then made that the vehicle drives driverlessly not out to that object but instead only out to a point that is located before that object in terms of the driving direction of the motor vehicle. This therefore advantageously ensures that a spacing or a distance is always maintained between the motor vehicle and that object.

According to a further example embodiment, an instantaneous speed of the motor vehicle is measured, the point being determined based on the measured instantaneous speed.

This brings about in particular a technical advantage that the point can be determined efficiently. The reason is that, for example, a braking distance for the motor vehicle is longer at a higher speed than at a lower speed. This therefore means that in such a case the distance to the point out to which safe driverless driving of the motor vehicle is possible is reduced as compared with the case in which the motor vehicle is driving driverlessly at a lower speed.

According to another example embodiment, provision is made that a movement of a traffic participant located within the parking facility is predicted, the point being determined based on the predicted movement.

This brings about in particular a technical advantage that the point can be determined efficiently. In particular, the technical advantage thereby brought about is that a risk of a collision with that traffic participant can also be efficiently decreased. For example, the point can then be determined in such a way that a predefined minimum spacing from the traffic participant is maintained regardless of where the traffic participant moves.

According to a further example embodiment, provision is made that a distance safety buffer is predefined so that, once the point has been determined, a new point in the target trajectory is determined which corresponds to that point on the target trajectory which is located, with reference to a driving direction predefined by the target trajectory, before the determined point and at a spacing corresponding to the distance safety buffer from the determined point on the target trajectory, the determined new point replacing the determined point.

This brings about in particular a technical advantage that, for example, measurement inaccuracies in the surrounding-area sensor suite and/or in the context of determination can be taken into account and, in particular, compensated for.

In accordance with a further example embodiment, provision is made that the motor vehicle automatically halts at the determined point if, for a route segment of the target trajectory located after the determined point, it has not been possible to determine a point out to which safe driverless driving of the motor vehicle is possible.

This brings about in particular a technical advantage that the collision risk can efficiently be even further reduced, since assurance is thereby provided that the motor vehicle is always driving driverlessly in a safe manner.

According to an example embodiment, provision is made that the apparatus for operating a motor vehicle driving driverlessly within a parking facility is embodied or configured to execute or carry out the method for operating a motor vehicle driving driverlessly within a parking facility.

Technical functionalities of the apparatus are evident analogously from corresponding technical functionalities of the method, and vice versa.

According to an example embodiment, provision is made that the method is carried out or executed by way of the apparatus.

According to an example embodiment, the apparatus includes a surrounding-area sensor suite.

According to an example embodiment, provision is made that the motor vehicle is embodied or configured to execute or carry out the method for operating a motor vehicle driving driverlessly within a parking facility.

According to an example embodiment, the parking facility encompasses a surrounding-area sensor suite.

According to another example embodiment, the motor vehicle encompasses a surrounding-area sensor suite.

According to an example embodiment, provision is made that the determination device is embodied to determine the point based on a sensing range of a surrounding-area sensor suite of the motor vehicle and/or on a sensing range of a surrounding-area sensor suite of the parking facility, so that the point is located within the corresponding sensing range.

In accordance with a further example embodiment, the surrounding-area sensor suite(s) encompass(es) several surrounding-area sensors having respective sensing ranges, the determination device being embodied to determine the point based on the shortest sensing range of the respective sensing ranges, so that the point is located within the shortest sensing range.

In yet another example embodiment, the several surrounding-area sensors correspond to a subset of all the surrounding-area sensors of the respective surrounding-area sensor suite.

In accordance with a further example embodiment, a measuring device for measuring an instantaneous speed of the motor vehicle is provided, the determination device being embodied to determine the point based on the measured instantaneous speed.

According to yet another example embodiment, a prediction device for predicting a movement of a traffic participant located within the parking facility is provided, the determination device being embodied to determine the point based on the predicted movement.

In another example embodiment, the determination device is embodied to determine, once the point has been determined, a new point in the target trajectory which corresponds to that point on the target trajectory which is located, with reference to a driving direction predefined by the target trajectory, before the determined point and spaced away with a predefined distance safety buffer from the determined point on the target trajectory, the determination device being embodied to replace the determined point with the determined new point, so that the determined point corresponds to the determined new point.

According to yet another example embodiment, the guidance device is embodied to automatically halt the motor vehicle at the determined point if, for a route segment of the target trajectory located after the determined point, it has not been possible to determine a point out to which safe driverless driving of the motor vehicle is possible.

According to an example embodiment, the determination of the point is carried out in the motor vehicle itself. The determination device is, for example, part of the motor vehicle.

In a further example embodiment, the determination of the point is carried out externally to the motor vehicle. The determination device is disposed, for example, in stationary fashion, i.e., externally to the motor vehicle.

In an example embodiment, the determination of the point is carried out both internally and externally to the motor vehicle, the two results being reconciled with one another.

The invention will be explained in further detail below with reference to preferred exemplifying embodiments.

DETAILED DESCRIPTION

Figure 1:
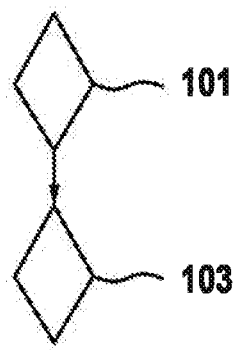
FIG. 1 is a flowchart of a method for operating a motor vehicle driving driverlessly within a parking facility, according to an example embodiment of the present invention.

FIG. 1 is a flowchart of a method for operating a motor vehicle driving driverlessly within a parking facility, according to an example embodiment of the present invention. The method includes: determining 101, for a predefined target trajectory to be traversed by the motor vehicle within the parking facility, that point on the target trajectory until which safe driverless driving of the motor vehicle is possible; and driverlessly driving 103 the motor vehicle, based on the predefined target trajectory, out to the determined point.

According to an example embodiment, the predefined target trajectory is conveyed via a communication network to the apparatus and/or to the motor vehicle. According to an example embodiment, a parking facility management system of the parking facility ascertains or calculates the predefined target trajectory and then transmits it via the communication network to the motor vehicle and/or to the apparatus.

According to an example embodiment, the predefined target trajectory is ascertained or calculated internally to the motor vehicle, i.e., in the motor vehicle itself.

According to an example embodiment, the predefined target trajectory is ascertained or calculated by way of the apparatus, for example by way of the determination device.

According to an example embodiment, the apparatus and/or the motor vehicle encompasses a communication interface for communication via a communication network.

The communication interface is embodied, for example, to receive the predefined target trajectory via a communication network.

Figure 2:
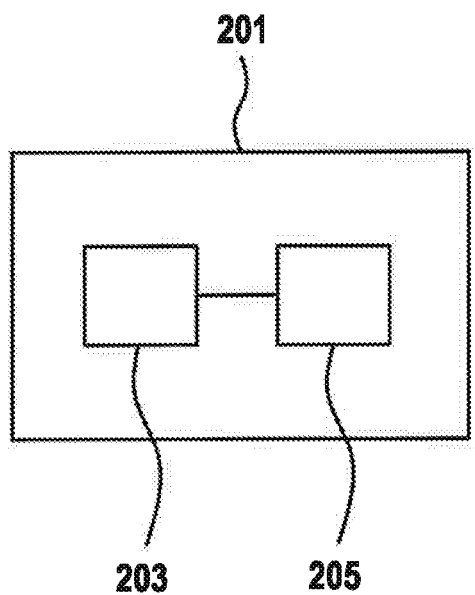
FIG. 2 shows an apparatus for operating a motor vehicle driving driverlessly within a parking facility, according to an example embodiment of the present invention

FIG. 2 shows an example apparatus 201 for operating a motor vehicle driving driverlessly within a parking facility. Apparatus 201 includes: a determination device 203 for determining, for a predefined target trajectory to be traversed by the motor vehicle within the parking facility, that point on the target trajectory until which safe driverless driving of the motor vehicle is possible; and a guidance device 205 for driverlessly guiding the motor vehicle, the guidance device being embodied to driverlessly guide the motor vehicle, based on the predefined target trajectory, out to the determined point.

Figure 3:
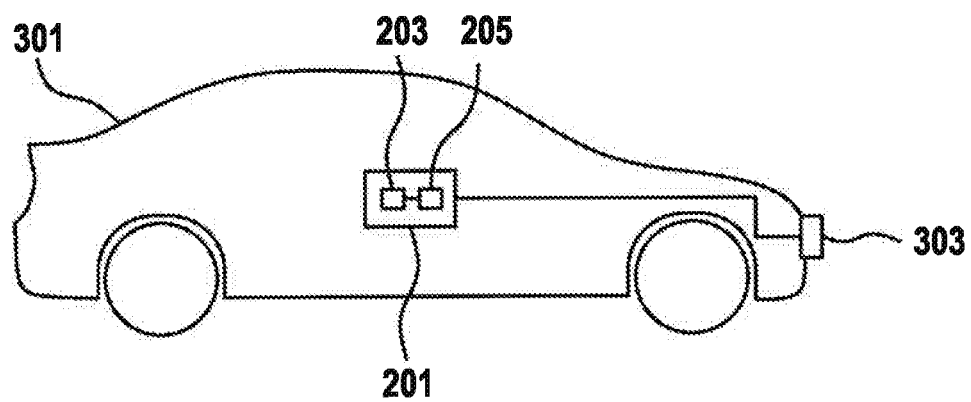
FIG. 3 shows a motor vehicle, according to an example embodiment of the present invention

FIG. 3 shows a motor vehicle 301 that includes apparatus 201 of FIG. 2.

Motor vehicle 301 furthermore encompasses a surrounding-area sensor 303 that is, for example, a radar sensor. In embodiments that are not shown, motor vehicle 301 encompasses several surrounding-area sensors. Surrounding-area sensor 303 and/or the several surrounding-area sensors constitute a surrounding-area sensor suite of motor vehicle 301.

Surrounding-area sensor 303 senses a surrounding area of motor vehicle 301, and ascertains surrounding-area data corresponding to the sensed surrounding area. Surrounding-area sensor 303, in general the surrounding-area sensor suite, makes those surrounding-area data available to apparatus 201 so that the latter can determine, based on the surrounding-area data, the point out to which motor vehicle 301 can safely drive driverlessly.

Figure 4:
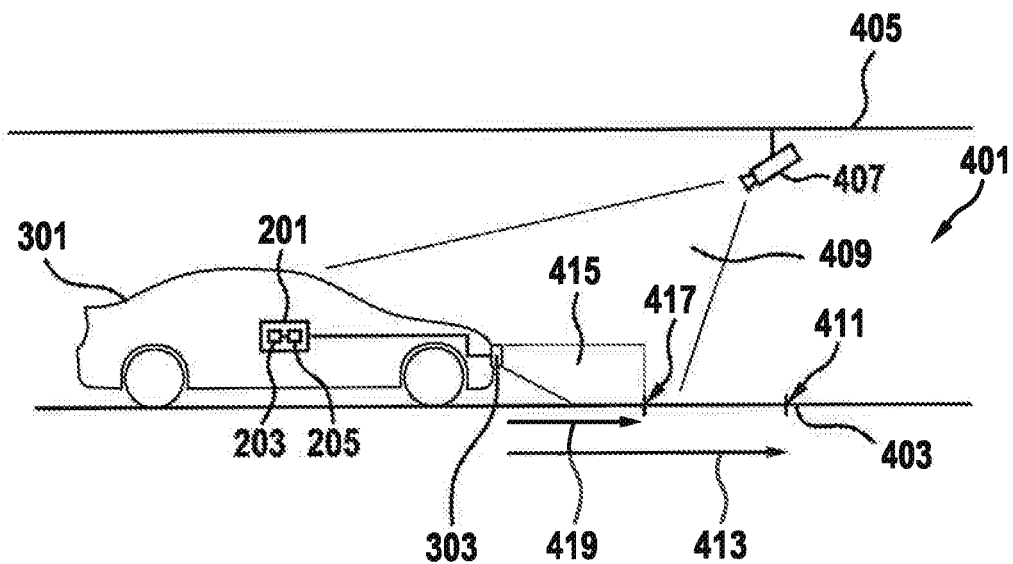
FIG. 4 shows the motor vehicle of FIG. 3 in the context of driverless driving within a parking facility, according to an example embodiment of the present invention.

FIG. 4 shows a parking facility 401 that includes a road surface 403 on which motor vehicle 301 drives driverlessly. Mounted on a ceiling 405 of parking facility 401 is a video camera 407 that can sense a front-side surrounding area 409 of motor vehicle 301.

Motor vehicle 301 likewise senses a front-side surrounding area 415 by way of its surrounding-area sensor suite, i.e., in particular by way of its surrounding-area sensor 303. Because surrounding-area sensor 303 has a shorter sensing range than video camera 407, surrounding area 415 is smaller than surrounding area 409.

Motor vehicle 301 furthermore includes yet another surrounding-area sensor that, in the interest of clarity, is not shown. This surrounding-area sensor has a longer range than surrounding-area sensor 303. A target trajectory to be traversed by motor vehicle 301 and which leads out to a point 411 on road surface 403 would thus be technically possible. This is because on the one hand, a larger surrounding area can be sensed using video camera 407 than using surrounding-area sensor 303. On the other hand, the further surrounding-area sensor has a correspondingly long sensing range so that the further surrounding-area sensor can sense the surrounding area of motor vehicle 301 out to point 411.

The arrow having reference character 413 symbolically identifies a driverless journey along a corresponding target trajectory which leads out to point 411.

Provision is nevertheless made according to an example embodiment of the present invention that surrounding-area sensor 303 having the shortest sensing range specifies the maximum distance out to which motor vehicle 301 can driverlessly drive. The point on road surface 411 corresponding to this maximum distance is identified by an arrow having the reference character 417. An arrow having the reference character 419 symbolically identifies the driverless journey of motor vehicle 301 out to point 417.

This therefore means that the motor vehicle will drive driverlessly only out to point 417, even though theoretically it could drive out to point 411. But because surrounding-area sensor 303 cannot sense the surrounding area of motor vehicle 301 out to point 411, this theoretical possibility is not provided for according to the present invention.

The example embodiments of the present invention described above thus facilitate safe driverless driving by motor vehicle 301 within parking facility 401.

As soon as motor vehicle has arrived at point 417, according to an example embodiment, motor vehicle 301 continues driverlessly driving. According to an example embodiment, however, this occurs only when it has been possible to determine, for a route segment located before that point 417, a point out to which safe driverless driving of motor vehicle 301 is possible. This point is determined, for example, analogously to point 417, based on the shortest sensing range, i.e., in this case based on the sensing range of surrounding-area sensor 303. This therefore means that motor vehicle 301 travels from point 417, for example, only a distance which corresponds to the distance that motor vehicle 301 has traveled from its instantaneous position to point 417.

If, however, it has not been possible to determine a point, after that point 417, until which safe driverless driving of motor vehicle 301 is possible, then according to an example embodiment, motor vehicle 301 is halted at point 417.

Safe driverless driving by the motor vehicle can thus always advantageously be facilitated.

The invention thus furnishes, in particular and inter alia, an efficient technical concept that can efficiently reduce an accident risk or collision risk for the driverlessly driving motor vehicle. According to example embodiments, the target trajectory to be traversed is shortened to a distance that is considered safe at that moment. According to an example embodiment, "shortening" means that the target trajectory remains limited to that distance. According to a further example embodiment, while the target trajectory still exists beyond that distance, only that portion of the target trajectory out to the distance is valid. "Valid" means that the motor vehicle is permitted to traverse the target trajectory only out to the distance.

According to an example embodiment, the safe distance is ascertained or determined by the region that can be viewed and analyzed by the surrounding-area sensors in the motor vehicle and/or by the parking facility.

According to an example embodiment, all the surrounding-area sensors of the motor vehicle and/or of the parking facility must view the region within which the motor vehicle is permitted to drive. This means that the maximum distance that the vehicle is permitted to drive is obtained from the surrounding-area sensor that has the shortest sensing range.

According to a further example embodiment, only a subset of the surrounding-area sensors, with reference to all the surrounding-area sensors, is used to calculate the distance, i.e., to determine the point. This is advantageous in particular when there are very many surrounding-area sensors. "Very many" means, for example, that there are more than five surrounding-area sensors. In the context of five surrounding-area sensors provision is made, for example, that only four surrounding-area sensors are used in order to calculate the distance.

According to an example embodiment, the maximum distance is ascertained or calculated based additionally on a vehicle speed. This means that as a result, for example, the maximum distance becomes shorter compared with the case in which the speed of the motor vehicle is not taken into account.

According to an example embodiment, a speed of objects that possibly will soon appear (for example further motor vehicles, pedestrians) is taken into account in or for the calculation of the maximum distance. This therefore means that a prediction of a movement of a traffic participant is carried out, the point being determined based on the predicted movement.

According to an example embodiment, a distance safety buffer is also taken into account, for example in order to take into account measurement inaccuracies in the context of the surrounding-area sensors and/or the analyses.

If the target trajectory happens not to be updated and therefore extended in a subsequent analysis step, the motor vehicle then travels at most out to the distance categorized as safe. This therefore means that according to an example embodiment, the motor vehicle automatically halts at the determined point if it has not been possible to determine, for a route segment of the target trajectory located beyond the determined point, a further point until which safe driverless driving of the motor vehicle is possible.

An advantage of the present invention is to be regarded in particular as being that the motor vehicle can drive driverlessly only to the end of the distance categorized as safe.

What is claimed is:

1. A method for operating a motor vehicle driving driverlessly within a parking facility, the method comprising:
   determining, by a processor and for a predefined target trajectory to be traversed by the motor vehicle within the parking facility, a point in the target trajectory until which safe driverless driving of the motor vehicle is possible; and
   based on the determination of the point, the processor controlling the motor vehicle to drive driverlessly no further than the determined point, wherein:
   the determining is based on a sensing by the at least one surrounding-area sensor arrangement of at least one of the motor vehicle and the parking facility, so that the determined point is restricted to within the sensing range of at least one surrounding-area sensor arrangement,
   the at least one surrounding-area sensor arrangement includes a plurality of surrounding-area sensors,
   each of the surrounding-area sensors includes a respective sensor range directed away from a front of the motor vehicle and along the target trajectory,
   a first one of the surrounding-area sensors including a first sensor range that is shorter than every other sensor range of every other one of the surrounding-area sensors and represents a shortest of the sensor ranges of the surrounding-area sensors, and
   the shortest of the sensor ranges is selected such that the determined point is disposed ahead of the front of the motor vehicle no farther than the shortest of the sensor ranges.

2. The method of claim 1, wherein the plurality of surrounding-area sensors is a subset of all surrounding-area sensors of the at least one surrounding-area sensor arrangement.

3. The method of claim 1, further comprising measuring an instantaneous speed of the motor vehicle, wherein the determining is based on the measured instantaneous speed.

4. The method of claim 1, further comprising determining a predicted movement of a traffic participant located within the parking facility, wherein the determining of the point is based on the predicted movement.

5. The method of claim 1, further comprising, subsequent to the determining of the point, identifying a new point in the target trajectory that is, with respect to a driving direction defined by the target trajectory, before the determined point and is separated from the determined point by a predefined safety buffer distance, wherein the location is at the new point.

6. The method of claim 1, further comprising the processor controlling the motor vehicle to halt at the location based (a) on the determined point and (b) on a further point in the target trajectory until which safe driverless driving of the motor vehicle is possible not being determined.

7. An apparatus for operating a motor vehicle driving driverlessly within a parking facility, the apparatus comprising:
   a processor interfacing with a guidance device of the motor vehicle, wherein the processor is configured to:
     determine, for a predefined target trajectory to be traversed by the motor vehicle within the parking facility, a point in the target trajectory until which safe driverless driving of the motor vehicle is possible; and
     based on the determination of the point, control the guidance device to driverlessly drive the motor vehicle no further than the determined point, wherein:
     the determining is based on a sensing by the at least one surrounding-area sensor arrangement of at least one of the motor vehicle and the parking facility, so that the determined point is restricted to within the sensing range of at least one surrounding-area sensor arrangement,
     the at least one surrounding-area sensor arrangement includes a plurality of surrounding-area sensors,
     each of the surrounding-area sensors includes a respective sensor range directed away from a front of the motor vehicle and along the target trajectory,
     a first one of the surrounding-area sensors including a first sensor range that is shorter than every other sensor range of every other one of the surrounding-area sensors and represents a shortest of the sensor ranges of the surrounding-area sensors, and
     the shortest of the sensor ranges is selected such that the determined point is disposed ahead of the front of the motor vehicle no farther than the shortest of the sensor ranges.

8. The apparatus of claim 7, wherein the determination is based on a sensing by the at least one surrounding-area sensor arrangement of at least one of the motor vehicle and the parking facility, so that the determined point is restricted to within the sensing range of the at least one surrounding-area sensor arrangement.

9. The apparatus of claim 8, wherein the at least one surrounding-area sensor arrangement includes a plurality of surrounding-area sensors having respective sensing ranges, the point being determined based on a shortest of the sensing ranges, so that the determined point is restricted to within the shortest sensing range.

10. The apparatus of claim 9, wherein the plurality of surrounding-area sensors is a subset of all surrounding-area sensors of the at least one surrounding-area sensor arrangement.

11. The apparatus of claim 7, wherein the determination is based on a measured instantaneous speed of the motor vehicle.

12. The apparatus of claim 7, wherein the processor is configured to determine a predicted movement of a traffic participant located within the parking facility, and the determination of the point is based on the predicted movement.

13. The apparatus of claim 7, wherein the processor is configured to, subsequent to the determination of the point, identify a new point in the target trajectory that is, with respect to a driving direction defined by the target trajectory, before the determined point and is separated from the determined point by a predefined safety buffer distance, the location being the new point.

14. The apparatus of claim 7, wherein the processor is configured to control the guidance device to halt the motor vehicle at the location based (a) on the determined point and (b) on a further point in the target trajectory until which safe driverless driving of the motor vehicle is possible not being determined.

15. A motor vehicle comprising an apparatus for operating the motor vehicle driving driverlessly within a parking facility, the apparatus comprising:
a processor interfacing with a guidance device of the motor vehicle, wherein the processor is configured to:
determine, for a predefined target trajectory to be traversed by the motor vehicle within the parking facility, a point in the target trajectory until which safe driverless driving of the motor vehicle is possible; and
based on the determination of the point, control the guidance device to driverlessly drive the motor vehicle no further than the determined point, wherein:
the determining is based on a sensing by the at least one surrounding-area sensor arrangement of at least one of the motor vehicle and the parking facility, so that the determined point is restricted to within the sensing range of at least one surrounding-area sensor arrangement,
the at least one surrounding-area sensor arrangement includes a plurality of surrounding-area sensors,
each of the surrounding-area sensors includes a respective sensor range directed away from a front of the motor vehicle and along the target trajectory,
a first one of the surrounding-area sensors including a first sensor range that is shorter than every other sensor range of every other one of the surrounding-area sensors and represents a shortest of the sensor ranges of the surrounding-area sensors, and
the shortest of the sensor ranges is selected such that the determined point is disposed ahead of the front of the motor vehicle no farther than the shortest of the sensor ranges.

16. A non-transitory computer-readable medium on which are stored instructions that are executable by a processor and that, when executed by the processor, cause the processor to perform a method for operating a motor vehicle driving driverlessly within a parking facility, the method comprising:
determining, for a predefined target trajectory to be traversed by the motor vehicle within the parking facility, a point in the target trajectory until which safe driverless driving of the motor vehicle is possible; and
based on the determination of the point, controlling the motor vehicle to drive driverlessly no further than the determined point, wherein:
the determining is based on a sensing by the at least one surrounding-area sensor arrangement of at least one of the motor vehicle and the parking facility, so that the determined point is restricted to within the sensing range of at least one surrounding-area sensor arrangement,
the at least one surrounding-area sensor arrangement includes a plurality of surrounding-area sensors,
each of the surrounding-area sensors includes a respective sensor range directed away from a front of the motor vehicle and along the target trajectory,
a first one of the surrounding-area sensors including a first sensor range that is shorter than every other sensor range of every other one of the surrounding-area sensors and represents a shortest of the sensor ranges of the surrounding-area sensors, and
the shortest of the sensor ranges is selected such that the determined point is disposed ahead of the front of the motor vehicle no farther than the shortest of the sensor ranges.

17. The method of claim 1, wherein:
the target trajectory is conveyed to the motor vehicle from the parking facility over a communication network, and
the processor for determining the determined point is disposed in the motor vehicle.

18. The apparatus of claim 7, wherein:
the target trajectory is conveyed to the motor vehicle from the parking facility over a communication network, and
the processor for determining the determined point is disposed in the motor vehicle.

19. The motor vehicle of claim 15, wherein:
the target trajectory is conveyed to the motor vehicle from the parking facility over a communication network, and
the processor for determining the determined point is disposed in the motor vehicle.

20. The non-transitory computer-readable medium of claim 16, wherein:
the target trajectory is conveyed to the motor vehicle from the parking facility over a communication network, and
the processor for determining the determined point is disposed in the motor vehicle.

* * * * *